(12) United States Patent
Mestres et al.

(10) Patent No.: US 8,196,052 B2
(45) Date of Patent: Jun. 5, 2012

(54) SYSTEM AND METHOD TO DISPLAY A WEB PAGE AS SCHEDULED BY A USER

(75) Inventors: Jean-Christophe Mestres, Vence (FR); Nicolas Schifano, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/749,254

(22) Filed: May 16, 2007

(65) Prior Publication Data

US 2008/0005672 A1      Jan. 3, 2008

(30) Foreign Application Priority Data

Jun. 30, 2006    (EP) .................................... 06116424

(51) Int. Cl.
*G06F 3/00* (2006.01)
(52) U.S. Cl. ........ 715/760; 715/205; 715/206; 715/738; 715/844; 715/851
(58) Field of Classification Search .................. 715/738, 715/851, 206, 205, 844
See application file for complete search history.

(56) References Cited

U.S. PATENT DOCUMENTS

| | | | | |
|---|---|---|---|---|
| 5,890,172 A * | 3/1999 | Borman et al. | ............... | 715/205 |
| 5,918,239 A * | 6/1999 | Allen et al. | ................... | 715/210 |
| 6,067,565 A * | 5/2000 | Horvitz | ........................ | 709/218 |
| 6,182,133 B1 * | 1/2001 | Horvitz | ........................ | 709/223 |
| 6,226,655 B1 * | 5/2001 | Borman et al. | ............... | 715/207 |
| 6,690,394 B1 * | 2/2004 | Harui | ............................ | 715/762 |
| 6,769,019 B2 * | 7/2004 | Ferguson | ...................... | 709/219 |
| 6,925,496 B1 * | 8/2005 | Ingram et al. | ................. | 709/224 |
| 6,938,216 B1 * | 8/2005 | Ishisaki | ........................ | 715/817 |
| 7,206,839 B2 * | 4/2007 | Ingram et al. | ................. | 709/224 |
| 7,376,896 B2 * | 5/2008 | Ullmann et al. | .............. | 715/704 |
| 7,490,288 B2 * | 2/2009 | Undasan | ....................... | 715/201 |
| 2001/0039546 A1 * | 11/2001 | Moore et al. | .................... | 707/10 |
| 2003/0135824 A1 * | 7/2003 | Ullmann et al. | .............. | 715/513 |
| 2004/0111488 A1 * | 6/2004 | Allan | ............................. | 709/217 |
| 2005/0135267 A1 * | 6/2005 | Galbraith et al. | ............. | 370/252 |
| 2006/0069617 A1 * | 3/2006 | Milener et al. | .................. | 705/14 |
| 2006/0143568 A1 * | 6/2006 | Milener et al. | ................ | 715/738 |
| 2006/0259938 A1 * | 11/2006 | Kinoshita et al. | ............. | 725/118 |
| 2007/0005587 A1 * | 1/2007 | Johnson et al. | ................... | 707/5 |
| 2007/0177208 A1 * | 8/2007 | McCall et al. | ............... | 358/1.18 |

* cited by examiner

*Primary Examiner* — Tadeese Hailu
*Assistant Examiner* — Patrick Riegler
(74) *Attorney, Agent, or Firm* — Andrea Bauer; Hoffman Warnick LLC

(57) ABSTRACT

The present invention is directed to a system and method for displaying a web page on a Graphical User Interface (GUI) in a computing device. A method in accordance with an embodiment of the invention includes: receiving a user request for displaying a web page upon an occurrence of an event associated with the user request; retrieving and storing a content of the web page corresponding to the user request; detecting an occurrence of the event associated with the user request; and displaying the content of to the web page on the GUI in response to detecting the event associated with the user request.

13 Claims, 4 Drawing Sheets

SYSTEM AND METHOD TO DISPLAY A WEB PAGE AS SCHEDULED BY A USER

FIELD OF THE INVENTION

The present invention generally relates to the display of content on a web page. More specifically, the present invention is directed to a system and method to display a web page as scheduled by a user.

BACKGROUND OF THE INVENTION

The traditional way users access a web page on the WWW (World Wide Web) is by typing the URL (Uniform Resource Locator) of the web page in the web browser or by clicking the hypertext link of the corresponding web page in the web browser. The URL or the hypertext link is resolved into its corresponding IP (Internet Protocol) address. A HTTP (Hypertext Transfer Protocol) request is made to the web server operating at the corresponding IP address. The web browser waits for the contents of the web page to be downloaded from the web server and displays the contents of the web page successively following the download. If the contents of the web page are resident in the web browser cache, the contents are retrieved immediately from the cache resulting in an instantaneous display of the web page.

Several advancements have been made to web browsers to speed up the display of the content of web pages by means of pre-fetching web links. Pre-fetching static links from web pages is a mechanism that exploits the idle time of web browsers to download the content of web pages having higher probability of being visited by the user in the future. Conventionally, text content of a web page is downloaded to the web browser's cache in order to pre-fetch the web page. Whenever the link corresponding to the cached web page is visited by the user, the web browser accesses the server to download non-text items like images of the requested web page. Further, the cached text items of the revisited web page are retrieved from the web browser's cache resulting in the display of the requested web page. Alternatively, the entire content of a requested web page that includes both text and non-text items can be downloaded from the web server to the web browser's cache. This results in increased network traffic and larger cache memory occupation.

There exist several methods for pre-fetching the content of a web page to a web browser's cache. In an existing method, a constant number of links in a web page are selected keeping in view the available bandwidth. A proposed solution for selecting specific links for pre-fetching is to scan a user's recently visited web sites or the browsing history and discover a generalized topic from the content of the visited web pages. The generalized topic can be used to look for topics within the links available in a web page for pre-fetching. However, scanning the user's browsing history to discover a common topic necessitates the requirement of more time and resources. Moreover, the user has no part to play while the contents of the requested web page are being fetched by the browser and has to remain idle until the entire web page is displayed. Furthermore, the user has no knowledge of when the web page will be displayed and cannot interact with the web page immediately when a request is made, by clicking on the concerned link.

SUMMARY OF THE INVENTION

The present invention provides a system and method for displaying a web page on a Graphical User Interface (GUI) of a computing device. Further, the present invention provides a system and method for facilitating the display of a web page as scheduled by a user.

An aspect of the invention is directed to a method for displaying a web page on a Graphical User Interface (GUI) of a computing device, comprising: receiving a user request for displaying a web page upon an occurrence of an event associated with the user request; retrieving and storing a content of the web page corresponding to the user request; detecting an occurrence of the event associated with the user request; and displaying the content of the web page on the GUI in response to detecting the event associated with the user request.

Another aspect of the present invention is directed to a system for displaying a web page on a Graphical User Interface (GUI) of a computing device, comprising: a system for receiving a user request for displaying a web page upon an occurrence of an event associated with the user request; a system for retrieving and storing a content of the web page corresponding to the user request; a system for detecting an occurrence of the event associated with the user request; and a system for displaying the content of the web page on the GUI in response to detecting the event associated with the user request.

Another aspect of the present invention is directed to a program product stored on a computer readable medium, which when executed, displays a web page on a Graphical User Interface (GUI) of a computing device, the computer readable medium comprising program code for: receiving a user request for displaying a web page upon an occurrence of an event associated with the user request; retrieving and storing a content of the web page corresponding to the user request; detecting an occurrence of the event associated with the user request; and displaying the content of the web page on the GUI in response to detecting the event associated with the user request.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION

Figure 1:
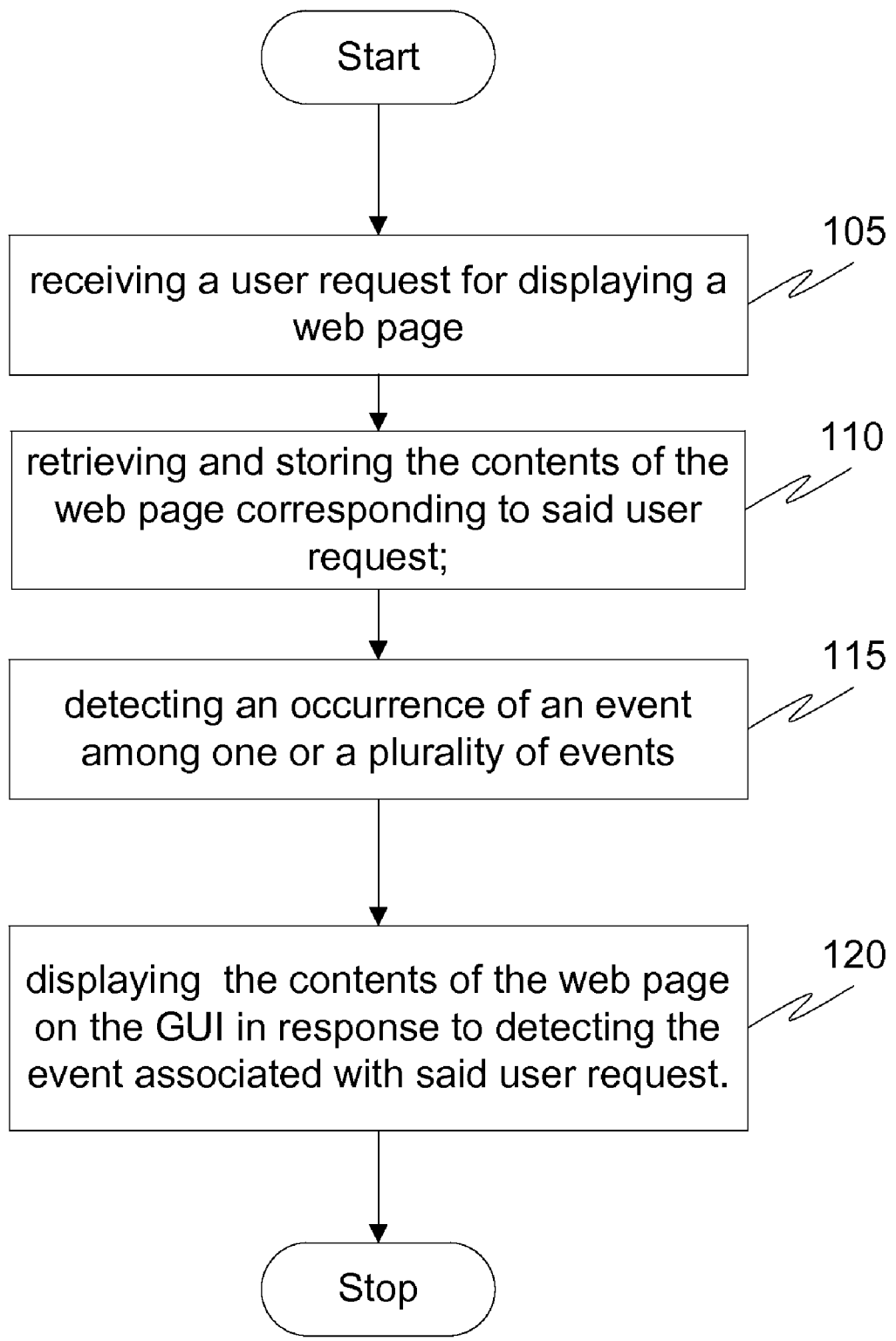
FIG. 1 is a flowchart of an illustrative method for scheduling the display of a web page by a user, in accordance with an embodiment of the invention.

Before describing in detail embodiments of the present invention, it should be observed that the embodiments reside primarily in combinations of method steps and system components related to systems and methods for scheduling the display of a web page by a user. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Various embodiments of the invention provide a system and method for displaying the content of a web page as scheduled by a user. A user request corresponding to a web page is received. The web page is displayed to the user on a GUI of a computing device after evaluation of the user request.

FIG. 1 is a flowchart of an illustrative method for displaying a web page on a GUI of a computing device, in accordance with an embodiment of an invention. A web page comprises a plurality of HTTP links to other web pages. A request to access a web page is generally made through a clicking event using a pointing device. A click is made on the corresponding HTTP link of a web page displayed in the form of text or non-text items like images.

At 105, a user request is received on a computing device for a web page. The computing device can be for example, a desktop computer, a laptop computer, a Personal Digital Assistant (PDA), a mobile phone, etc. In an embodiment of the invention, the user request is a result of a user action on the HTTP link corresponding to the web page by means of one or a plurality of keyboard keys or/and a pointing device. Further, a user request is associated with one or a plurality of events. The one or plurality of events associated with the user request are identified for the purpose of displaying the web page requested by the user. In an embodiment of the invention, an event associated with the user request can comprise, for example, detecting the receipt of a user command for displaying the content of the web page. The user command is a result of a user action on the link corresponding to the web page by means of one or a plurality of keyboard keys or/and the pointing device.

In another embodiment of the invention, the receipt of a user request on the link of a web page initiates the starting of a counter with a time period. The counter is displayed on the GUI of the computing device. Further, the counter facilitates the user in scheduling the display of one or a plurality of web pages. A time period is retrieved from the user request and the counter is set with the corresponding time period. The display of the user requested web page is delayed for a time period that is set in the counter. Moreover, in another embodiment of invention, the time period that is to be retrieved from the user request can be computed based on a prolonged action of the user on the keyboard or/and the pointing device. For example, if a user accesses a web page link for a time period of 2 seconds, the time delay can be computed as 2 min for scheduling the display of the web page. It would be apparent to a person skilled in the art that various relations between the time-period and the time-delay can be established for the purpose of scheduling the display of the web page.

At 110, the content of the user requested web page is retrieved from a web server. Further, the retrieved content is stored in the memory of the computing device.

At 115, the occurrence of one or a plurality of events associated with the display of the user requested web page is detected. In an embodiment of the invention, the event can be receiving a user command on the hypertext link of a web page, by means of one or a plurality of keyboard keys or/and a pointing device. In another exemplary embodiment of the invention, the event can be the lapsing of the time period in the counter for the display of the user requested web page. The display of the user requested web page is initiated immediately when the time period set in the counter is hit. The web page requested by the user is displayed at 120, when one or a plurality of events corresponding to the display of the web page is detected.

Figure 2:
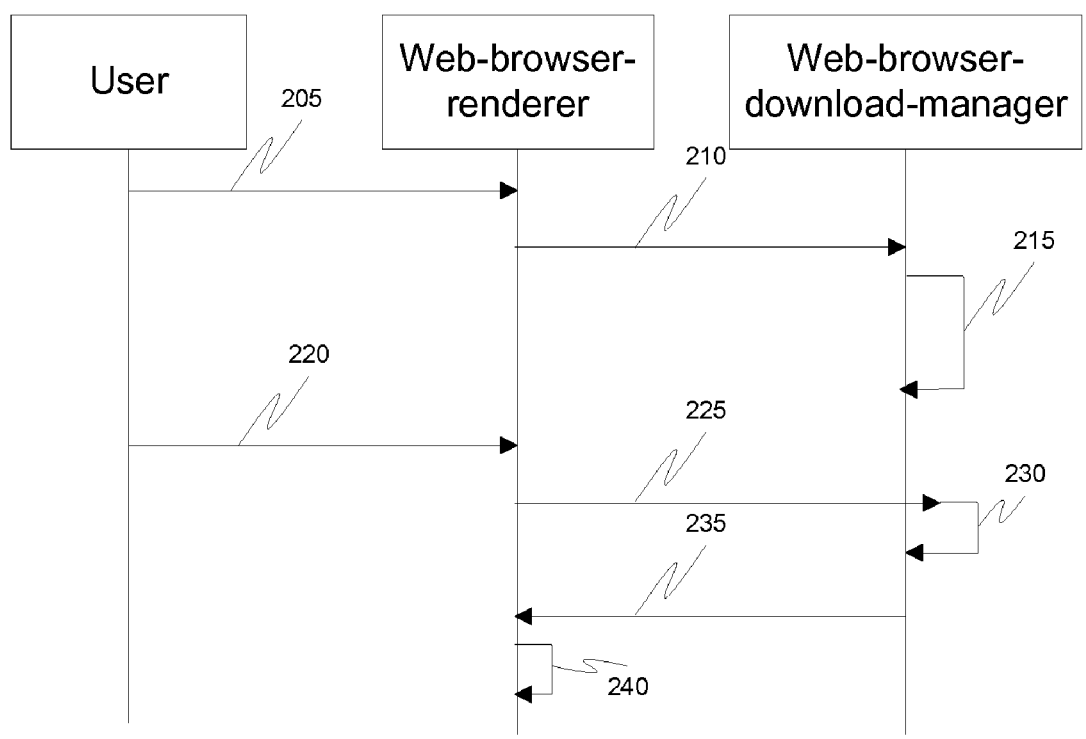
FIG. 2 is a sequence diagram for evaluating the scheduling of the display of a web page using a two-click event, in accordance with an exemplary embodiment of the invention.

FIG. 2 illustrates a sequence diagram for scheduling the display of a web page in accordance with an exemplary embodiment of the invention. At 205, the user requests a web page by accessing the link corresponding to the web page by means of one or a plurality of keyboard keys or/and a pointing device. On receiving a request to access the web page, a web-browser-renderer sends a request to a web-browser-download-manager at 210. On receiving the request for retrieving and storing the web page content, the web-browser-download-manager sends a request to a web server for downloading the content of the requested web page. A communication link is established between the web-browser-download-manager and the web server following the request to download the content of the web page. The web server in response to the request made by the web-browser-download-manager sends the content of the web page to the web-browser-download-manager at 215. The web-browser-download-manager downloads the content of the web page to the web browser's cache. In the case that some of the content corresponding to the requested web page is already available in the browser's cache, the web-browser-download-manager makes a download request to the web server for downloading the remaining content of the requested web page.

At 220, a user command is issued when the user re-accesses the link of the requested web page by means of one or a plurality of keyboard keys or/and the pointing device. A request to access the content of the retrieved and stored web page is made by the web-browser-renderer to the web-browser-download-manager at 225. At 230, the web-browser-download-manager queries the web browser's cache to download the content of the requested web page. At 235, the content of the requested web page are downloaded from the web browser's cache. Consequently, the downloaded content of the requested web page is sent to the web-browser-renderer in response to its request made at 225. The web-browser-renderer renders the web page at 240, using the content of the web page received from the web-browser-download-manager. The requested web page is displayed instantaneously after the content of the web page is rendered at 240. The rendered web page is displayed on the GUI of the computing device.

When a user is involved in heavy web surfing activity, the user action on a plurality of links to access the corresponding web pages is treated as a retrieve and store request for the corresponding web pages. The web-browser-download-manager retrieves and stores the content of one or a plurality of requested web pages to the web browser's cache. Subsequently, when the user re-accesses one or a plurality web page links, the content of the requested one or a plurality of web pages is displayed instantaneously on the GUI of the computing device.

Figure 3:
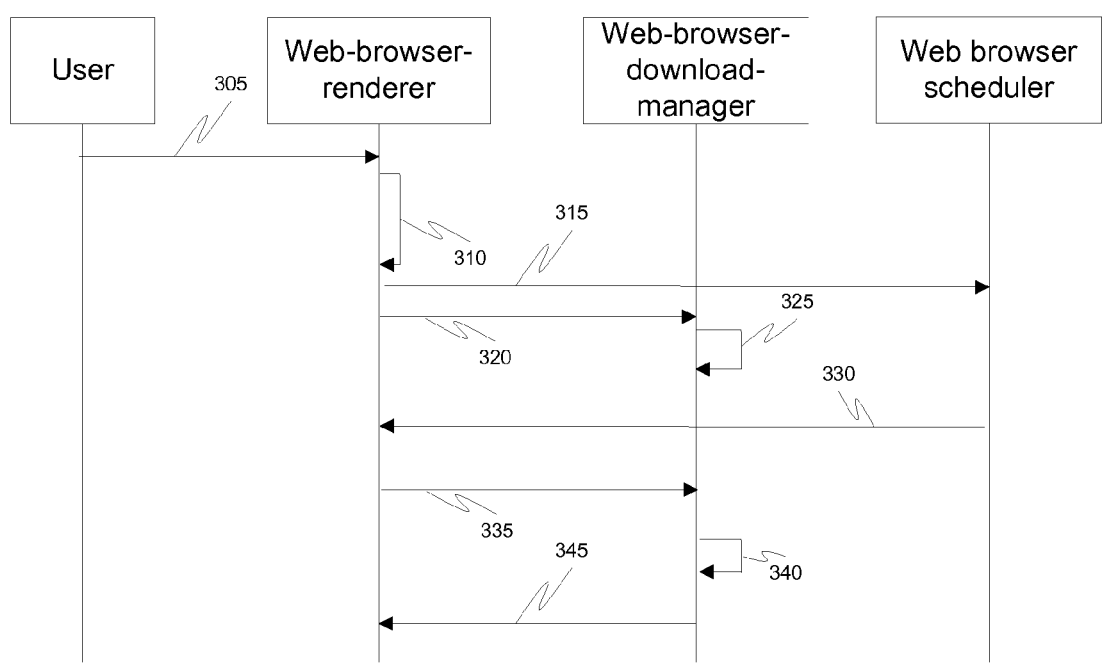
FIG. 3 is a sequence diagram for evaluating the scheduling of the display of a web page using a delayed click event, in accordance with an exemplary embodiment of the invention.

FIG. 3 illustrates a sequence diagram for scheduling the display of a web page in accordance with another exemplary embodiment of the invention. At 305, a user request is made to access a web page by means of prolonged action on one or a plurality of keyboard keys or/and the pointing device. A counter is started and displayed at 310, after detecting the event of receiving a user command on the link of the requested web page. The user can set a time period in the counter to schedule the display of the requested web page. Alternatively, a time period to schedule the display of the web page can be selected from a menu. The menu may be displayed on the GUI of the computing device, when the link of the web page is accessed by means of one or a plurality of keyboard keys or/and a pointing device. At 315, the web-browser-scheduler schedules the display of the requested web page by delaying the display for a time period set by the user in the counter.

Subsequently, the web-browser-renderer sends a request to the web-browser-download-manager at 320. After receiving the request for retrieving and storing the web page content, the web-browser-download-manager sends a request to a web server to download the content of the web page. A communication link is established between the web-browser-download-manager and the web server following the request to download the content of the web page. The web server, in response to the request made by the web-browser-download-manager, sends the content of the web page to the web-browser-download-manager. The content of the web page is downloaded to the web browser's cache at 325.

At 330 the time period set in the counter scheduled for the display of the requested web page is hit. Consequently, a request to access the content of the retrieved and stored web page is made by the web-browser-renderer to the web-browser-download-manager at 335. The web-browser-download-manager queries the browser's cache to download the content of the requested web page and retrieves the web page content from the web browser's cache at 340. Consequently the web page content is sent to the web-browser-renderer. The web-browser-renderer renders the web page at 345, using the content of the web page received from the web-browser-download-manager. The requested web page is displayed instantaneously after the content of the web page are rendered. The rendered web page is displayed on the GUI of the computing device.

Figure 4:
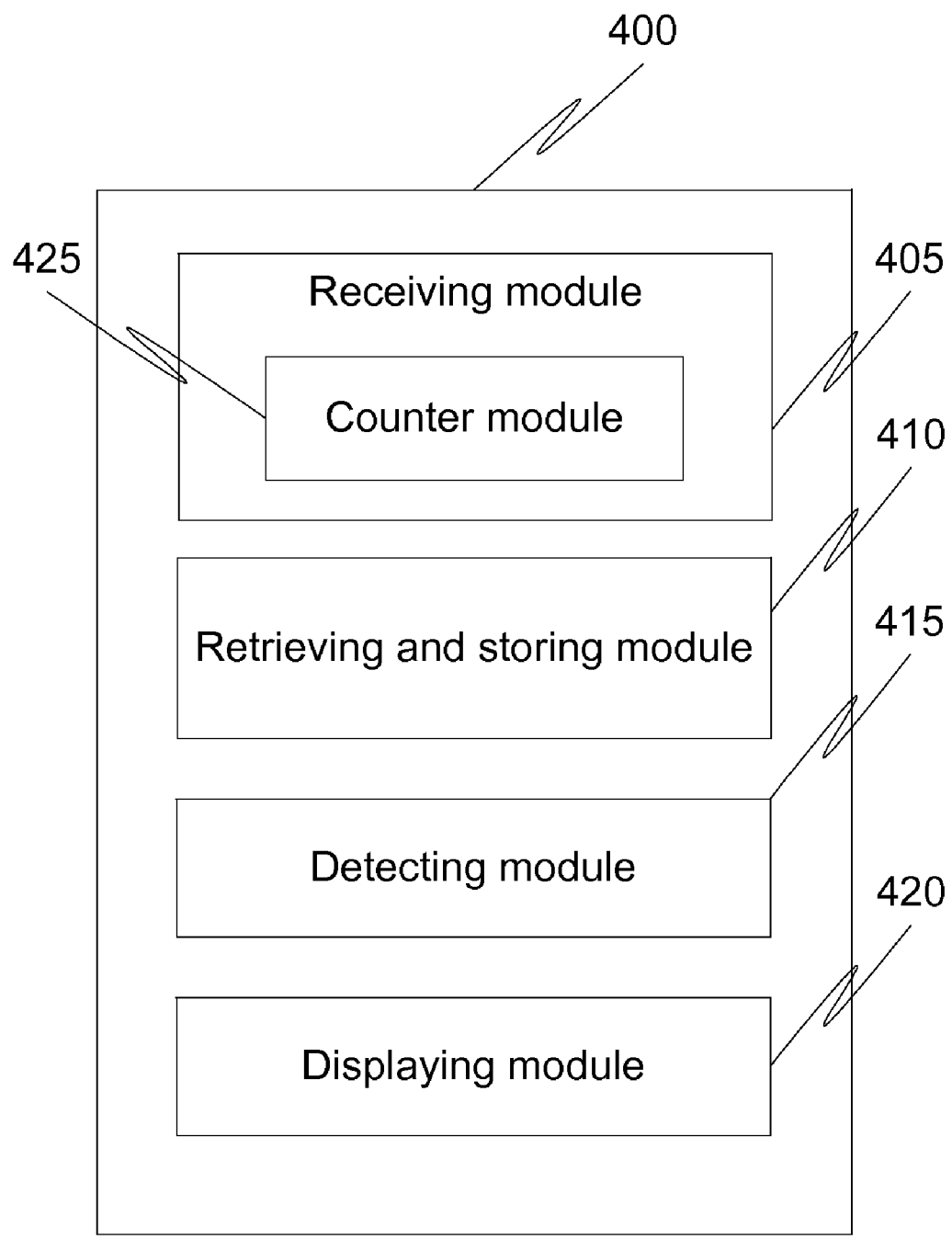
FIG. 4 is a block diagram a system for displaying a web page on the GUI of a computing device, in accordance with an embodiment of the invention

FIG. 4 is a block diagram of a system 400 for displaying a web page on the GUI of a computing device, in accordance with an embodiment of the invention. System 400 comprises a receiving module 405, a retrieving and storing module 410, a detecting module 415 and a display module 420.

Receiving module 405 receives a user request for displaying the content corresponding to a web page. In an embodiment of the invention, the user request is a result of a user action on the HTTP link corresponding to a web page. The receiving module 405 receives the user request by means of one or a plurality of keyboard keys or/and pointing device.

In another exemplary embodiment of the invention, the receiving module 405 receives a user request by means of a prolonged user action on one or a plurality of keyboard keys or/and pointing device.

The receiving module 405 comprises a counter module 425. In an exemplary embodiment of the invention, when the receiving module 405 receives a user request on the link of a web page, the counter module 425 is activated. A time period is retrieved from the user request by the receiving module 405. The counter module 425 facilitates setting the retrieved time period in the counter that is displayed on the GUI of the computing device. The display of the requested web page is delayed by the counter module 425, for a time period that is set in the counter. Moreover, in another embodiment of invention, the time period that is to be retrieved from the user request, is computed by the counter module 425 based on the prolonged user action on one or a plurality of keyboard keys or/and the pointing device.

The retrieving and storing module 410 retrieves the content of the requested web page from the web server. Further, the retrieved content of the web page is stored in the memory of the computing device by the retrieving and storing module 410.

The occurrence of one or a plurality of events associated with the display of the user requested web page is detected by the detecting module 415. In an embodiment of the invention, the event can be detecting the receipt of a user command on the hypertext link of the web page, by means of one or a plurality of keyboard keys or/and a pointing device. In another exemplary embodiment of the invention, the event can be lapsing of the time period set in the counter, for the display of the user requested web page. The web page requested by the user is displayed by the displaying module 420, when one or a plurality of events corresponding to the display of the web page is detected by the detecting module 415.

Various embodiments of the invention provide a system and method for displaying the contents corresponding to a web page to a user. The method facilitates user in scheduling the display of a web page so as to minimize any waiting time in displaying the content of the web page. Further, the method pre-fetches the content corresponding to only those links that are specified by the user. Therefore, load on the network is reduced and memory space in the computing device is conserved.

The method for displaying a web page on a GUI of a computing device, as described in the invention or any of its components, may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for displaying a web page on a Graphical User Interface (GUI) of a computing device, comprising:

receiving a user request for displaying a web page, wherein a user using an input device stays at a web page link for a request time period;

initiating a counter with a display time period in response to the user request, wherein the display time period is calculated from the request time period and the display time period is longer than the request time period;

retrieving and storing a content of the web page corresponding to the user request;

detecting when the display time period has elapsed; and displaying the content of the web page on the GUI when the display time period has elapsed.

2. The method according to claim 1, wherein receiving a user request further comprises: identifying an event associated with the user request.

3. The method according to claim 1, wherein the user request is a result of a user action on a link corresponding to the web page using at least one keyboard key or a pointing device.

4. The method according to claim 1, wherein detecting an occurrence of an event further comprises:

detecting a receipt of a user command for displaying the content of the web page.

5. The method according to claim 4, wherein the user command is a result of a user action on a link corresponding to the web page using at least one keyboard key or a pointing device.

6. The method according to claim 1, wherein the computing device is selected from the group consisting of a desktop computer, a laptop computer, a Personal Digital Assistant (PDA), and a mobile phone.

7. A system for displaying a web page on a Graphical User Interface (GUI) of a computing device, comprising:

a system for receiving a user request for displaying a web page, wherein a user using an input device stays at a web page link for a request time period;

a system for initiating a counter with a display time period in response to the user request, wherein the display time period is calculated from the request time period and the display time period is longer than the request time period;

a system for retrieving and storing a content of the web page corresponding to the user request;

a system for detecting when the display time period has elapsed; and a system for displaying the content of the web page on the GUI when the display time period has elapsed.

8. The system according to claim 7, wherein the system for receiving a user request further comprises: a system for identifying an event associated with the user request.

9. The system according to claim 7, wherein the user request is a result of a user action on a link corresponding to the web page using at least one keyboard key or a pointing device.

10. The system according to claim 7, wherein the system for detecting an occurrence of an event further comprises: a system for detecting a receipt of a user command for displaying the content of the web page.

11. The system according to claim 7, wherein the user command is a result of a user action on a link corresponding to the web page using at least one keyboard key or a pointing device.

12. The system according to claim 7, wherein the computing device is selected from the group consisting of a desktop computer, a laptop computer, a Personal Digital Assistant (PDA), and a mobile phone.

13. A program product stored on a computer readable storage element, which when executed, displays a web page on a Graphical User Interface (GUI) of a computing device, the computer readable storage element medium comprising program code for:

receiving a user request for displaying a web page, wherein a user using an input device stays at a web page link for a request time period;

initiating a counter with a display time period in response to the user request, wherein the display time period is calculated from the request time period and the display time period is longer than the request time period;

retrieving and storing a content of the web page corresponding to the user request;

detecting when the display time period has elapsed; and displaying the content of the web page on the GUI when the display time period has elapsed.

\* \* \* \* \*